United States Patent
Micek et al.

(10) Patent No.: US 10,337,885 B2
(45) Date of Patent: Jul. 2, 2019

(54) VOLTAGE PATTERN ANALYSIS SYSTEM AND METHOD

(71) Applicant: WindLogics Inc., Juno Beach, FL (US)

(72) Inventors: Catherine Micek, Woodbury, MN (US); Ken Williams, Minneapolis, MN (US); Marc Light, Saint Paul, MN (US)

(73) Assignee: INVENTUS HOLDINGS, LLC, Juno Beach, FL (US)

( * ) Notice: Subject to any disclaimer, the term of this patent is extended or adjusted under 35 U.S.C. 154(b) by 525 days.

(21) Appl. No.: 14/882,778

(22) Filed: Oct. 14, 2015

(65) Prior Publication Data

US 2017/0108572 A1    Apr. 20, 2017

(51) Int. Cl.
*G01R 19/00* (2006.01)
*G01D 4/00* (2006.01)

(52) U.S. Cl.
CPC .................................... *G01D 4/00* (2013.01)

(58) Field of Classification Search
CPC ........................................................ G01D 4/00
USPC ............................................................ 702/64
See application file for complete search history.

(56) References Cited

U.S. PATENT DOCUMENTS

| | | | |
|---|---|---|---|
| 6,988,043 B1 | 1/2006 | Randall | |
| 7,272,518 B2 | 9/2007 | Bickel et al. | |
| 7,940,039 B2 | 5/2011 | de Buda | |
| 8,786,463 B2 | 7/2014 | Brennan et al. | |
| 2009/0043519 A1 | 2/2009 | Bridges et al. | |
| 2010/0278162 A1 | 11/2010 | Groux et al. | |
| 2012/0141301 A1 | 6/2012 | Van Der Spek et al. | |
| 2014/0214218 A1* | 7/2014 | Eldridge | G01D 4/002 700/286 |
| 2014/0300210 A1 | 10/2014 | Abi-Ackel et al. | |

FOREIGN PATENT DOCUMENTS

WO    2010/029339 A2    3/2010

OTHER PUBLICATIONS

Wang et al., "RPL Based Routing for Advanced Metering Infrastructure in Smart Grid", IEEE Smart Grid Communication Workshop, Jul. 2010, Mitsubishi Electric Research Laboratories.
Megalingam et al., "Advanced Digital Smart Meter for Dynamic Billing, Tamper Detection and Consumer Awareness", IEEE, 2011.

* cited by examiner

*Primary Examiner* — Huan Hoang
(74) *Attorney, Agent, or Firm* — Tarolli, Sundheim, Covell & Tummino LLP

(57) ABSTRACT

A voltage pattern analysis system and method may automate aspects of the process of mapping or assigning utility meters to a specific transformer or other distribution node by identifying misassociated meters and correcting a system-wide transformer assignment or distribution node assignment. When a meter's voltage signal does not correlate well with other meters' voltage signals on the same transformer, the meter is likely misassociated to that transformer. A pairwise voltage signal correlation may be computed for all meters assigned to a transformer and a voltage signal correlation for every transformer in the system, or a subset thereof, may be imputed. Individual meter correlations may then be compared with the transformer correlation. For meters identified as misassociation candidates, transformers or other distribution nodes within a specified radius may be considered for reassignment of the meter.

17 Claims, 6 Drawing Sheets

VOLTAGE PATTERN ANALYSIS SYSTEM AND METHOD

FIELD OF THE DISCLOSURE

This disclosure relates generally to mapping utility meters to a specific associated transformer in a utility system topology and, more particularly, to a system and method of identifying a meter that has been erroneously mapped and correcting an associated system-wide transformer assignment for that meter in the context of a metered utility distribution system.

BACKGROUND

Typical utility distribution network analysis technologies generally use primitive mechanisms to map how each meter in a given system or portion thereof is assigned to the various power transformers in the system. This is true even though it may be very beneficial (for purposes of billing, troubleshooting, or load evaluation and distribution map planning, for instance) for the utility provider to be able to identify the power transformer to which a particular meter is mapped, associated, assigned, or otherwise coupled. In an electric power distribution system such as those operated by many utility companies, the meter generally measures electric power delivered by the utility provider, so such mapping of meters to power transformers can represent vital information under various circumstances (in the event of an outage, for instance, in which case knowledge of a transformer failure can provide an indication of how many meters or customers are affected). For example, meter-transformer topology may be used when calculating an electric load on the distribution grid—in such situations, errors in the topology may result in errors in the load calculation. Even in the context of measuring or quantifying other metered utilities, such as water, natural gas, or telephone services, for instance, it may be true that the meter itself is receiving the utility from a distribution node such as a transformer for electricity or a pressure regulator/pump for water or gas, so mapping or assigning meters to distribution nodes may have beneficial results in these applications as well.

Specifically, an industry-wide problem facing utility providers is the identification and correction of erroneous mapping of customer-to-transformer (or meter-to-transformer) relationships. A mismatch (or "misassociation") between what is recorded in the utility provider's computer systems versus what actually exists in the field may cause problems in various processes. For example, a meter may become disconnected from a respective transformer during a storm. In the reconnection process (where the emphasis is on restoration of power quickly), a meter may be reconnected to a different transformer. The correct meter-transformer association may not be recorded at the time of reconnection in such exigent circumstances. In such situations, although the connection in the field has changed, the meter-transformer association in the utility provider's computer systems has not been changed to reflect a new association. In addition to current misassociations that render the utility provider's records inaccurate, there may also be transformers present in the field that have never been documented, recorded, logged, or otherwise recognized by the utility provider's system. Such errors are typically identified and resolved passively through post-outage analysis or proactively through mapping tools; in either case, these remediation approaches are manual in nature and thus require human intervention and much effort, and in some cases can even require field visits.

BRIEF SUMMARY OF THE DISCLOSURE

The following presents a simplified summary of the disclosure in order to provide a basic understanding of some aspects of the invention. This summary is not an extensive overview of every implementation disclosed herein. It is intended to neither identify key or critical elements of the various implementations nor delineate the scope of the disclosure. Its sole purpose is to present some concepts of the disclosure, in accordance with the various implementations disclosed herein, in a simplified form as a prelude to the more detailed description that is presented later.

In one implementation of the disclosure, a method employing voltage pattern analysis in a metered utility distribution system may generally comprise: calculating a signal correlation for each meter assigned to a distribution node in a set of distribution nodes in the utility distribution system; imputing a voltage signal correlation for each distribution node in the set of distribution nodes; performing an outlier analysis by comparing an individual meter correlation with results of the imputing to identify a meter candidate for reassignment; and responsive to said performing, for a meter identified as a meter candidate, identifying a different distribution node within a specified radius as a distribution node candidate. The method may further comprise reassigning the meter candidate to the distribution node candidate according to the identifying. In some implementations, the imputing may comprise computing summary statistics of a pairwise voltage signal correlation for each of the meters assigned to a particular distribution node; additionally the computing may comprise quantifying how well each meter correlates with other meters on the assigned distribution node. The performing may comprise identifying a misassociation threshold, and optionally, comparing a correlation value for each meter with the misassociation threshold. In accordance with the disclosure, the utility, may be an electrical distribution utility and a distribution node corresponds to a transformer. In this embodiment, the reassigning may comprise creating a meter-transformer candidate pair comprising the candidate meter and the candidate transformer. The reassigning may further comprise imputing a modified voltage signal correlation for the candidate transformer taking into consideration the candidate meter, quantifying how well the candidate meter correlates with other meters assigned to the candidate transformer, or both.

In another implementation of the disclosure, a voltage pattern analysis system employed in connection with a metered utility distribution system may generally comprise computer hardware and a computer-readable storage medium and operative to: calculate a pairwise voltage signal correlation for each meter assigned to a transformer in a set of transformers in the utility distribution system; impute a voltage signal correlation for each transformer in the set of transformers; perform an outlier analysis by comparing an individual meter correlation with results of the imputed voltage signal correlation to identify a meter candidate for reassignment; responsive to the outlier analysis, for a meter identified as a meter candidate, identify a different transformer within a specified radius as a transformer candidate; and reassign the meter candidate to the transformer candidate. Such a system may be further configured and operative to compute summary statistics of a pairwise voltage signal correlation for each of the meters assigned to a particular transformer. In some implementations, the outlier analysis may comprise comparing a correlation value for each meter with a misassociation threshold. The system may be further configured and operative to quantify how well the candidate meter correlates with other meters assigned to the candidate transformer.

In another implementation of the disclosure, a method employing voltage pattern analysis in a metered utility distribution system may generally comprise: calculating a signal correlation for each meter assigned to a transformer in a set of transformers in the utility distribution system; imputing a voltage signal correlation for each transformer in the set of transformers; performing an outlier analysis by comparing an individual meter correlation with results of the imputing to identify a meter candidate for reassignment; and responsive to the performing, for a meter identified as a meter candidate, reassigning the meter candidate to a transformer candidate. The reassigning may comprise identifying the transformer candidate within a specified radius from the meter candidate. The calculating may comprise calculating a pairwise voltage signal correlation for each meter assigned to a transformer in a set of transformers in the utility distribution system. In accordance with some implementations, the reassigning may comprise creating a meter-transformer candidate pair comprising the candidate meter and the candidate transformer; the reassigning may comprise imputing a modified voltage signal correlation for the candidate transformer taking into consideration the candidate meter. In some implementations, reassigning may further comprise quantifying how well the candidate meter correlates with other meters assigned to the candidate transformer.

The following description and the annexed drawings set forth certain illustrative aspects of the implementations of the disclosure. These aspects are indicative, however, of but a few of the various ways in which the principles of the disclosure may be employed and the various implementations are intended to include all such aspects and their equivalents. Other advantages and novel features will become apparent from the following description when considered in conjunction with the drawings.

DETAILED DESCRIPTION

Figure 1:
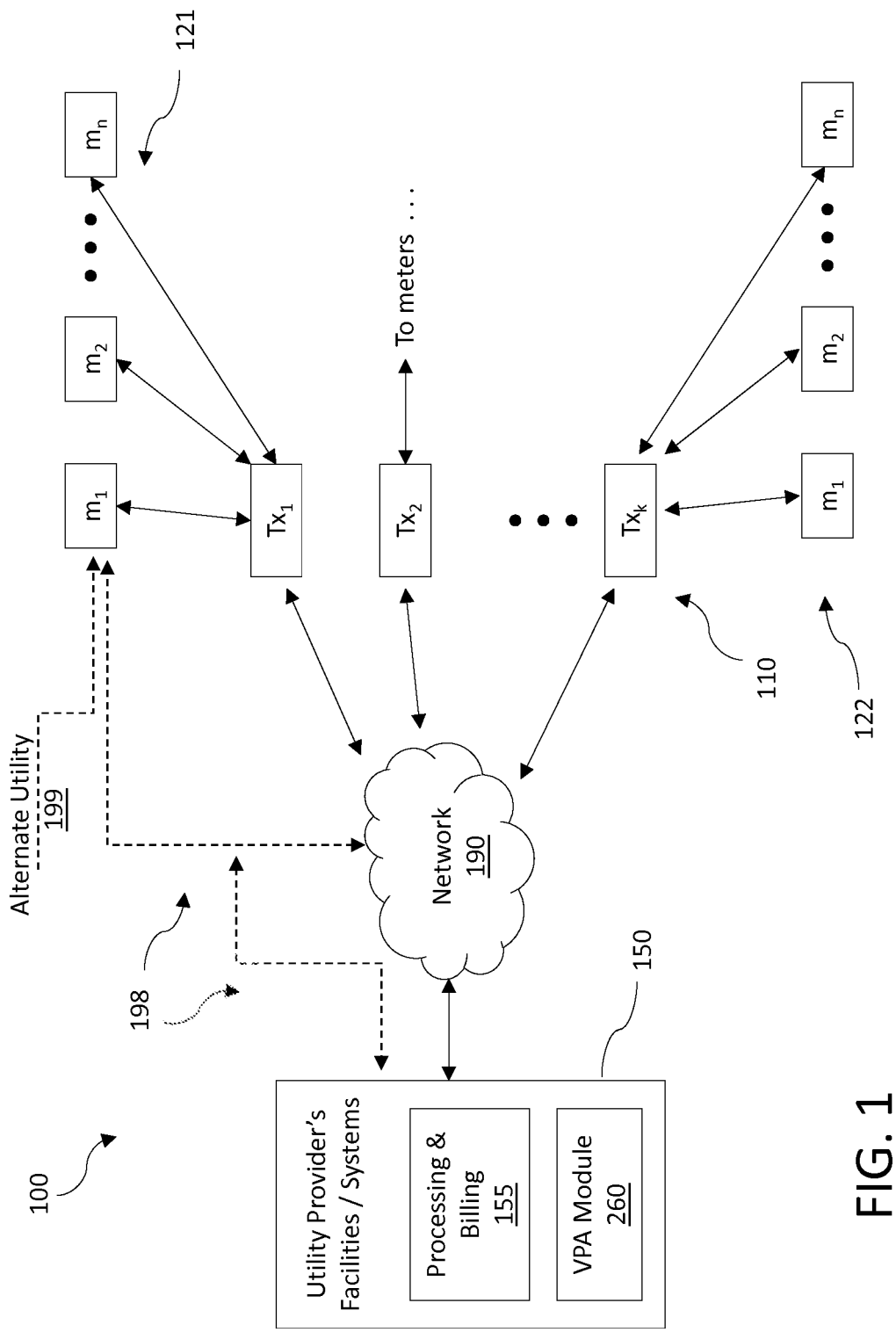
FIG. 1 is a block diagram illustrating components of implementations of a utility distribution system employing voltage pattern analysis techniques.

The following detailed description and the appended drawings describe and illustrate some implementations of the disclosure for the purpose of enabling one of ordinary skill in the relevant art to make and use these implementations. As such, the detailed description and illustration are purely illustrative in nature and are in no way intended to limit the scope of the disclosure in any manner. It should also be understood that the drawings are not necessarily to scale and in certain instances details which are not necessary for an understanding of the disclosure may have been omitted, such as details of fabrication and assembly. In the accompanying drawings, like numerals represent like components.

In the context of the present application, the terms "utility," "service," and "provision," as the context suggests, generally refer to any of various known or future metered utilities or services provided by or from a central or distributed company or service provider. Examples of utility distribution enterprises may include, but are not limited to, power distribution companies, natural gas distribution companies, commercial or municipal water or sewer service providers, cable or satellite television providers, telephone service providers, and the like. While it will be apparent that aspects of the implementations disclosed may be particularly suited to electrical power distribution network applications, it should also be appreciated that the disclosed systems and methods are readily adapted to any utility or service distribution network in which voltage may be supplied via a transformer to a meter, customer premises equipment (CPE), or other device located at a residence, business, building, or site serviced by the utility. Specifically, the various implementations disclosed herein may be implemented in connection with any system or method in which metering of utilities or other services is necessary or desirable.

As set forth in detail below, and in contrast to traditional approaches, a voltage pattern analysis ("VPA") system and method may leverage interval voltage reads on utility meters, such as smart meters deployed at residential or commercial customers' sites, to automate, in whole or in part, diagnosis and resolution of network topology errors or discrepancies in distribution geographical information system ("GIS") or customer information system ("CIS") applications.

In one implementation of the disclosure, a method employing voltage pattern analysis in a metered utility distribution system may generally comprise: calculating a signal correlation for each meter assigned to a distribution node in a set of distribution nodes in the utility distribution system; imputing a voltage signal correlation for each distribution node in the set of distribution nodes; performing an outlier analysis by comparing an individual meter correlation with results of the imputing to identify a meter candidate for reassignment; and responsive to said performing, for a meter identified as a meter candidate, identifying a different distribution node within a specified radius as a distribution node candidate. In another implementation of the disclosure, a voltage pattern analysis system employed in connection with a metered utility distribution system may generally comprise computer hardware and a computer-readable storage medium and operative to: calculate a pairwise voltage signal correlation for each meter assigned to a transformer in a set of transformers in the utility distribution system; impute a voltage signal correlation for each transformer in the set of transformers; perform an outlier analysis by comparing an individual meter correlation with results of the imputed voltage signal correlation to identify a meter candidate for reassignment; responsive to the outlier analysis, for a meter identified as a meter candidate, identify a different transformer within a specified radius as a transformer candidate; and reassign the meter candidate to the transformer candidate. In yet another implementation of the disclosure, a method employing voltage pattern analysis in a metered utility distribution system may generally comprise: calculating a signal correlation for each meter assigned to a transformer in a set of transformers in the utility distribution system; imputing a voltage signal correlation for each transformer in the set of transformers; performing an outlier analysis by comparing an individual meter correlation with results of the imputing to identify a meter candidate for reassignment; and responsive to the performing, for a meter identified as a meter candidate, reassigning the meter candidate to a transformer candidate.

Turning now to the figures, FIG. 1 shows a simplified high level block diagram illustrating components of implementations of a utility distribution system employing voltage pattern analysis techniques. As illustrated in FIG. 1, an utility distribution system 100 may generally comprise a service provider's facilities and systems (reference numeral 150) that are configured and operative to provide metered utility services in cooperation with individual meters $m_1$, $m_2, \ldots m_n$ (reference numerals 121 and 122), each of which may be located at a commercial or residential customer site. Each meter 121,122 may be coupled to a network 190 and to a power source (not illustrated in FIG. 1) via a transformer $Tx_1$, $Tx_2, \ldots, Tx_k$ (reference numeral 110). It will be appreciated that some or all of the transformers 110 in a commercial implementation may generally be operably coupled to a number of meters 121, 122 exceeding that illustrated in FIG. 1, though many meters 121, 122 have been omitted from the drawing for clarity. Likewise, a distribution system 100 may employ many more transformers 110 than represented in FIG. 1.

As illustrated in FIG. 1, network 190 represents both a utility distribution network as well as a communication network, such as a wide area network (WAN) or the Internet, for example. In one implementation, network 190 represents an electric power distribution grid and a communications system enabling bi-directional data communication between meters 121, 122 and service provider 150; this may be embodied in the Internet for example, or in a proprietary data communication network deployed by the service provider 150. In an alternative implementation in which the utility service is not provision of electric power, meters 121, 122 may be coupled to an alternate source of utility services, such as a natural gas line or a water main, for instance (this is represented in FIG. 1 by the dashed line identified by reference numeral 199), even though operating power is still being received via transformers 110 and network 190. In some implementations, meters 121, 122 may communicate with service provider 150 via communication mechanisms that omit transformers 110, and may or may not omit network 190, depending upon operational characteristics of meters 121, 122, network 190, and the alternate communication infrastructure (this is represented in FIG. 1 by the dashed lines identified by reference numeral 198).

Service provider systems and facilities 150 are generally configured and operative to provide metered utility services (via network 190 or alternate 199) to customers and to monitor or regulate those services in conjunction with meters 121, 122; meters 121, 122, in turn, are generally coupled to transformers 110 and operative to communicate (via network 190 or alternate communication infrastructure 198) with service provider 150 in accordance with predetermined or dynamically programmable instructions. In that regard, meters 121, 122 may be embodied in hardware and firmware that is generally referred to as advanced metering infrastructure (AMI), or "smart," meters. Implementations of AMI are disclosed, for instance, in U.S. application Ser. No. 13/676,702, U.S. Pat. Nos. 8,645,239, and 9,047,757, the contents of which are incorporated herein by reference in their entirety. As such, meters 121, 122 may be configured to comply with government or industry standards such are known in the art or developed and adopted in accordance with applicable regulations. Communication may be selectively wired or wireless, or both, depending upon the operational characteristics of meters 121, 122, networks 190 and 198, and the structure and nature of service provider facilities and systems 150.

In particular, service provider facilities and systems generally comprise processing and billing systems 155, as is generally known. In FIG. 1, block 155 represents the various monitoring, customer service, troubleshooting, maintenance, load balancing, accounting, billing, and other types of activities that are necessary or desirable to operate a utility service. In some instances where such activities are computationally expensive or require a great deal of processor power or communication bandwidth, some implementations of processing and billing systems 155 may be distributed across many processing and memory storage resources, and even distributed across buildings as is generally known in the art. Accordingly, though service provider facilities and systems 150 are depicted in FIG. 1 as a single, unified entity, it will be appreciated that block 150 represents any number of physical buildings, computer server facilities, and other physical and logical resources owned, operated, or otherwise under the control of the relevant utility service provider.

Service provider facilities and systems 150 also may comprise a VPA module 260. In operation, VPA module 260 may coordinate with processing and billing systems 155, and may share some of the same processing, memory, database, or other hardware resources, for example. As set forth in more detail below, VPA module 260 may provide, either independently or in cooperation with other hardware or software components, functionality operative to automate identification of a meter 121,122 that processing and billing systems 155 has erroneously associated with a particular transformer 110.

Figure 2:
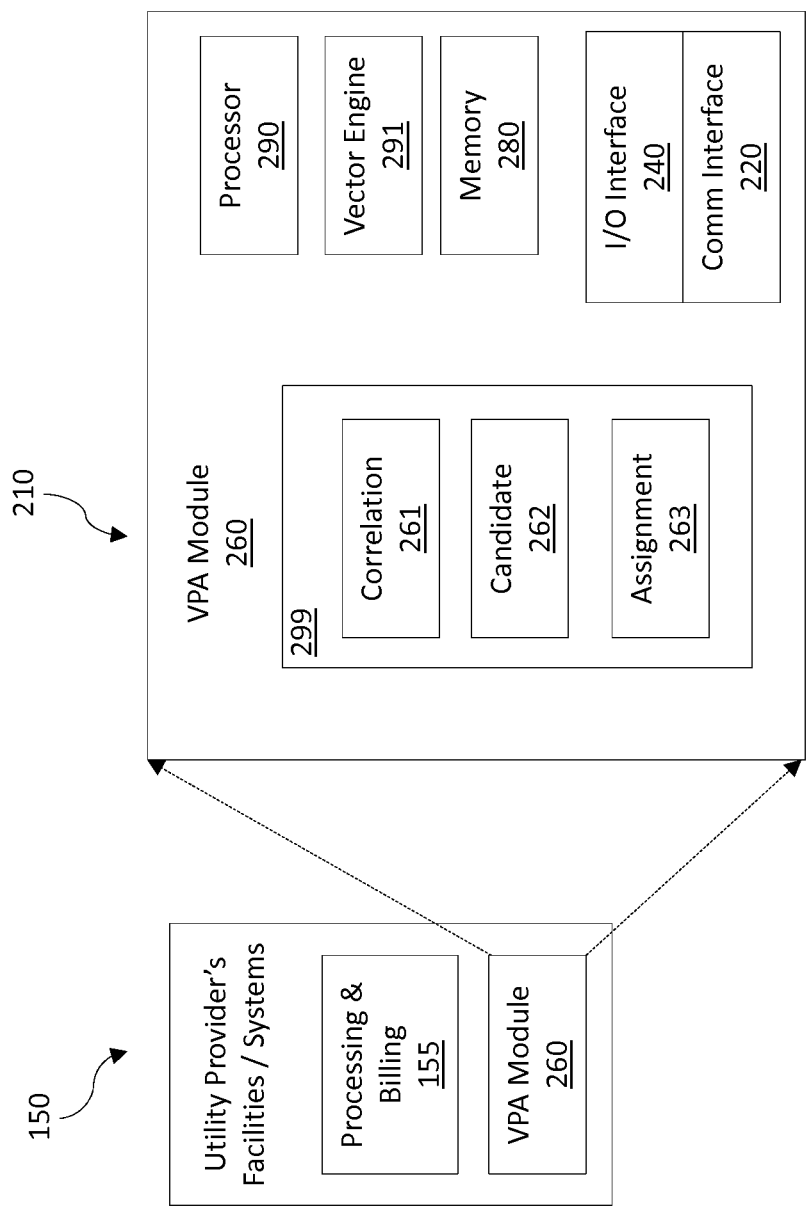
FIG. 2 is a functional block diagram illustrating components of an implementation of a VPA module.

FIG. 2 is a functional block diagram illustrating components of an implementation of a VPA module. Specifically, the components and operations set forth above with reference to FIG. 1 and below with reference to FIG. 3 may be employed or otherwise operative in conjunction with an electronic environment (reference numeral 210 in FIG. 2) generally embodied in or comprising a digital computer or other suitable electronic data processing system that may incorporate elements to enable VPA functionality as set forth herein. It will be appreciated that the FIG. 2 arrangement is presented for illustrative purposes only, and that processing environment 210 and VPA module 260 may be implemented with any number of additional components, modules, or functional blocks such as are generally known in the electronic and data processing arts; the number and variety of components incorporated into or utilized in conjunction with VPA module 260 may vary in accordance with, inter alia, overall system requirements, hardware capabilities or interoperability considerations, desired performance characteristics, or application-specific factors. Specifically, VPA module 260 may be modified or adapted as required or desired to operate in cooperation with a respective service provider's processing and billing systems 155.

In the illustrated arrangement. VPA module 260 may be embodied in a general purpose computing device or system (i.e., a personal computer (PC), such as a workstation, tower, desktop, laptop, tablet, smart-phone, or hand-held portable computer system). Computer servers, such as blade servers, rack mounted servers, multi-processor servers, and the like, may provide superior data processing capabilities relative to personal computers, particularly with respect to computationally intensive operations or applications; accordingly, VPA module 260 may be embodied in or comprise such a server system or distributed "big data" processing system and attendant memory as noted above. It will be appreciated that various techniques as set forth herein may be considered entirely hardware and software "agnostic," i.e., VPA systems and methods as illustrated and described may be compatible with any hardware configuration, and may be operating system and software platform independent.

In the illustrated implementation, VPA module 260 generally comprises processing resources (processor 290), a data storage medium (memory 280), an input/output interface 240, a communications interface or port 220, and a power supply (not shown). As indicated in FIG. 2, VPA module 260 may additionally comprise a vector engine 291 to facilitate vector (or single instruction, multiple data (SIMD)) computations executed by processor 290 as described below with reference to FIG. 3.

It will be appreciated that the various components, in various combinations, illustrated in FIG. 2 may be operably coupled, directly or indirectly, to one or all of the other components, for example, via a data bus or other data transmission pathway or combination of pathways (not shown). Similarly, power lines or other energy transmission conduits providing operating power from a power supply to the various system components are not illustrated in FIG. 2 for simplicity; these power lines may be incorporated into or otherwise associated with the data bus, as is generally known in the art.

In operation, processor 290 may execute software or other programming instructions encoded on a non-transitory computer-readable storage medium such as memory 280, and additionally may communicate with other components to facilitate mapping of meters to transformers in a utility distribution application. In that regard, processor 290, vector engine 291, or both may comprise or incorporate one or more microprocessors or microcomputers, and may include integrated data storage media (e.g., cache memory) operative to store data and instruction sets which influence configuration, initialization, memory arbitration, and other operational characteristics of processor 290. Those of skill in the art will appreciate that vector engine 291 may be incorporated into processor 290 in some arrangements.

It is generally well understood that any number or variety of peripheral equipment, such as a video display and a keyboard, for example, may be coupled to VPA module 210 via interface 240 without inventive faculty. Examples of such peripheral devices include, but are not limited to: input devices; output devices; external memory or data storage media; printers; plotters; routers; bridges; cameras or video monitors; sensors; actuators; and so forth. User input, for example, affecting or influencing operation of the other components of VPA module 260 may be received at interface 240 and selectively distributed to processor 290, vector engine 291, memory 280, or some combination thereof.

VPA module 260 may be capable of bidirectional data communication via communications port 220. Accordingly, VPA module 260 may have access to data resident on, or transmitted by, any number or variety of servers, computers, workstations, terminals, telecommunications devices, and other equipment coupled to, or accessible via, a network such as a local area network (LAN), a wide area network (WAN), a virtual private network (VPN), the internet, and so forth (i.e., any system or infrastructure enabling or accommodating bi-directional data communication between network-enabled devices). Accordingly, as noted above, VPA module 260 may be implemented in connection with a big data or other distributed processing and decentralized memory paradigm, and may leverage data resident on or accessible by a utility provider's facilities and systems 150. From the foregoing, it will be appreciated that utility usage data communicated from meters 121, 122 such as described above with reference to FIG. 1 may be received via communications port 220, for example, or accepted via interface 240.

Regarding specific VPA functionality, the illustrated implementation of VPA module 260 includes a VPA-specific processing block 299 that generally comprises a correlation component 261, a candidate component 262, and an assignment component 263. Correlation component 261 may perform calculations to impute a voltage signal correlation for each pairing of meter 121,122 and transformer 110 in the utility distribution environment 100. As noted above, VPA techniques can leverage these voltage correlation data accurately to map meters 121, 122 to transformers 110 across the utility distribution grid. Candidate component 262 may perform calculations (such as outlier analyses, for instance) based upon output from correlation component 261 to identify specific meters 121, 122 that are misassociation candidates, i.e., meters 121, 122 that a utility provider's processing and billing systems 155 have erroneously assigned to an incorrect transformer 110 in the utility distribution environment 100. Such misassociations can materially impact the utility provider's business operations as well as the level of service provided to customers assigned to respective meters 121, 122. Based upon output from correlation and candidate components 261 and 262, assignment component 263 may perform calculations to identify which meters 121, 122 identified as potentially misassociated or misassigned should properly be re-assigned to a different transformer 110. Accordingly, the various elements in VPA-specific processing block 299 may cooperate to automate much of the effort associated with identifying and rectifying the problem of mismatched or mismapped meters 121, 122 vis-á-vis known, or even previously unknown, transformers 110 in a utility provider's processing and billing systems 155.

Figure 3:
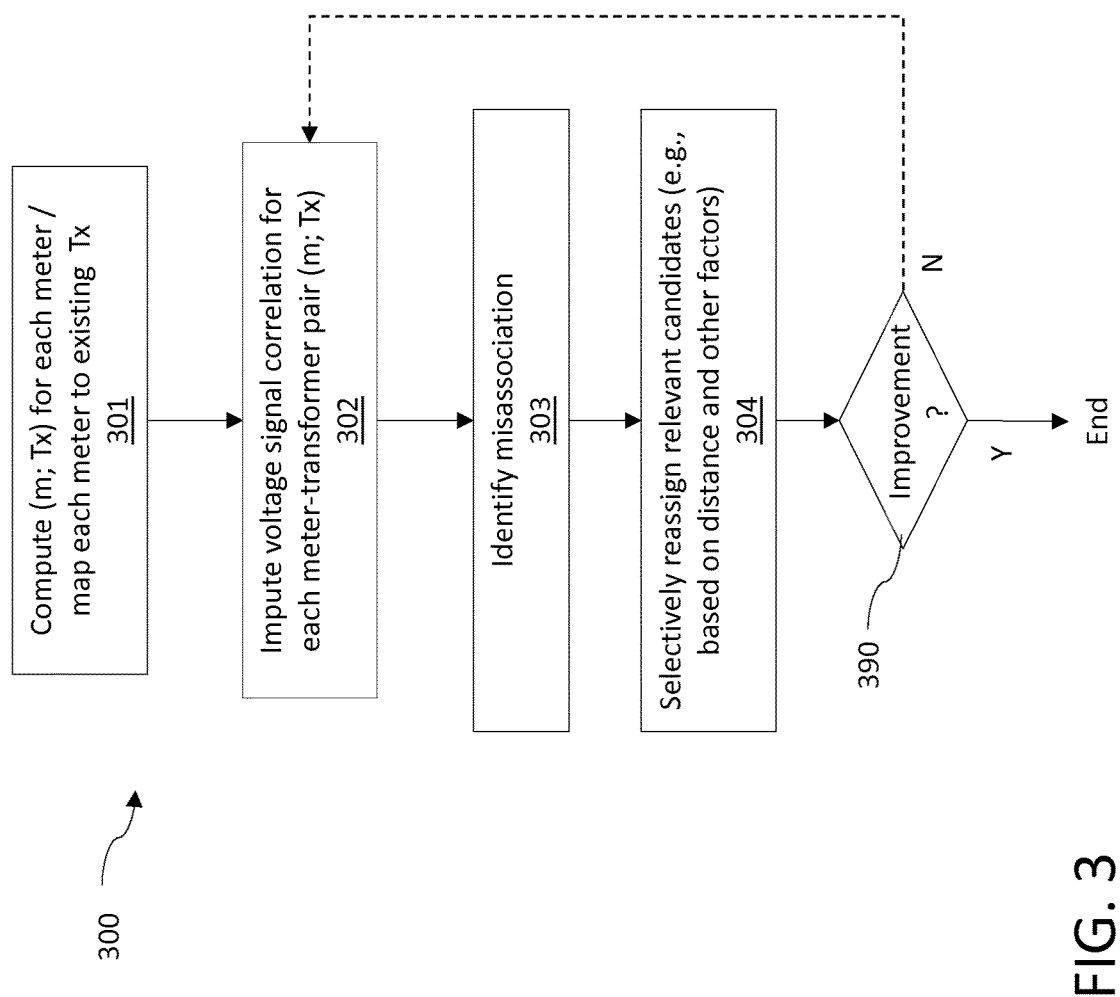
FIG. 3 is a flow diagram illustrating the general operational flow of exemplary implementations of a utility distribution system employing voltage pattern analysis.

Operation of VPA module 260, in general, and VPA-specific processing block 299, in particular, may be executed under control of, or in conjunction with, processor 290, data or instruction sets resident in memory 280, or some combination thereof such that VPA module 260 may be configured and operative to enable the functionality set forth herein with specific reference to FIGS. 1 and 3. It will be appreciated that while components of VPA module 260 are depicted as discrete elements in FIG. 2 for simplicity of description, some or all of their respective functionalities may be selectively combined or integrated, either with each other or with various other components within the processing environment 210.

For example, correlation component 261, candidate component 262, and assignment component 263 (or some combination thereof) may be integrated into a single element or functional module, and may be embodied in a software application resident in memory 280, for instance, or in a hardware component such as an application specific integrated circuit (ASIC). With respect to hardware solutions, those of skill in the art will appreciate that field programmable gate arrays (FPGAs), programmable logic controllers (PLCs), programmable single electron transistor (SET) logic components, or combinations of other electronic devices or components may be implemented and suitably configured to provide some or all of the functionality of VPA module 260 components, either individually or in combination. Any selectively configurable or suitably programmable hardware element or combination of elements generally known in the art or developed and operative in accordance with known principles may be employed. With respect to software solutions, those of skill in the art will appreciate that the functionality described herein may be enabled by processor 290, vector engine 291, or some other suitably configured hardware component.

In one implementation, processor 290, vector engine 291, or their respective functionalities may reside or otherwise be located external to VPA module 260; in such an arrangement, the foregoing communication and interoperability of VPA module 260 with processing and billing systems 155 may be enabled by, or facilitated with assistance from, I/O interface 240 or communications port 220. This arrangement may have particular utility in instances where the capabilities (e.g., computational bandwidth, operating frequency, etc.) of processor 290 are limited relative to an external or otherwise dedicated data processing system (not shown in FIG. 2).

The specific arrangement and particular implementation of a VPA module 260 (such as the FIG. 2 implementation) within the environment of a utility distribution system 100 are susceptible to a myriad of variations. The present disclosure is not intended to be limited to any particular configuration or implementation (hardware versus software, for example) of utility distribution system 100, or by the operational capabilities, structural arrangement, or functional characteristics of VPA module 260.

Given the foregoing, it will be appreciated that the terms "module" and "component" as used herein generally refer to a functional block that is configured and operative to effectuate a particular result. A module or component may be embodied in electronic hardware, firmware code, software instruction sets, or a combination of these and other elements. Where a module or component may be entirely implemented in software code or instructions, for instance, it is generally understood that such software is to be executed by hardware or a processing element suitably adapted to parse the code and to execute the instructions in connection with readily available or otherwise accessible data that are relevant to or necessary for the contemplated operation. Some such hardware structures are set forth above, though the present disclosure is not intended to be limited to known hardware technologies or configurations.

In the foregoing manner, and as generally depicted in FIG. 3, a VPA system and method may automate identification and correction of erroneously assigned meters in the context of a metered utility distribution system. In that regard, an aspect of the present VPA approach greatly reduces, and possibly eliminating, the necessity of manual intervention to correct misassociations of meters 121, 122 with transformers 110 in a utility distribution grid topology and, as a result, may provide a great improvement in the efficiency of identifying, applying, or otherwise implementing corrections to the grid topology. In particular, a VPA system and method such as described herein may automate (either partially or entirely) the process of identifying, locating, and correcting network topology errors. In addition, since VPA methodologies may be applied or implemented over all the data in a utility provider's system, this approach may systematically find errors in the topology that may not be found simply by relying on mapping tools or field visits. Finally, accuracy improvements in grid topology may impact other applications that use the grid topology for related or additional calculations.

In accordance with one aspect, a VPA system and method may automate the foregoing functionality and correct meter-transformer assignments in a GIS/CIS database by leveraging the fact that every transformer 110 in a given network topology generally has a unique voltage pattern. As is generally known, transient response characteristics may not be uniform across transformers due to limitations associated with manufacturing techniques—since there may be slight differences in the coils and windings in different transformers, no two transformers are identical in construction and voltage response. Furthermore, each metered site represents a time varying load that results in voltage variations which affect the voltage of other meters coupled to a common transformer. On the other hand, voltage changes due to time varying loads at one metered site 121 may be isolated from the voltage of other meters 122 coupled to a different transformer. By calculating pairwise voltage signal correlation for all the meters 121, 122 assigned to a particular transformer 110 and imputing a voltage signal correlation for every meter on that transformer, the VPA system and method may recognize if a meter appears to be misassociated to the transformer to which it is currently mapped. Outlier analysis based, for instance, on the pairwise voltage signal correlations related to a particular transformer may be used to identify misassociation candidates, i.e., meters that appear to be misassociated to that particular transformer. If a meter is identified as a misassociation candidate, the VPA system and method may then identify all transformers within a specified radius (e.g., 80 m-160 m, 153 m, 200 m, etc.) to which the misassociation candidate may be assigned. Radius information, i.e., the distance between a particular meter and a particular transformer, may include data maintained in connection with a distribution system map at service provider 150, data obtained via a global positioning system (GPS) or other geo-location technologies, observational or measured distance data acquired during field visits or surveys, or data obtained or computed as a combination of these and other sources. These meter-transformer pairs may be treated as reassignment candidates, and the imputed voltage signal correlation may then be re-calculated for all such reassignment candidates. In some instances, the meter-transformer pair with a maximum correlation value may be assumed to be the correct meter-transformer mapping. During general operation of a VPA system and method, if a meter is found to have a higher correlation with a transformer that it is not the transformer to which the meter is currently assigned, the meter may be tagged for reassignment and given a score based upon, for example, correlation and distance from the meter to the currently assigned transformer or to a different transformer generating a higher correlation value.

In operation, a VPA system and method may utilize data associated with or otherwise related to meter-transformer topology (i.e., the actual and relative physical and/or logical locations of meters and transformers in the network space) and AMI meter voltage readings. Those of skill in the art will appreciate that this represents a large amount of data, even for a small utility distribution system. By way of example, in south Florida and elsewhere, there are about 4.5 million meters in the Florida Power & Light ("FPL"™) system; in some commercial implementations, it may be desirable that a VPA system and method monitor and acquire up to two (2) months of voltage readings on every meter to calculate correlations, though some implementations may be suitably configured to be operative while acquiring more or fewer readings over different time spans (depending, for example, upon time of year, average or peak load, usage interruptions or demand changes due to natural disasters or environmental considerations, or a combination of these and/or other factors). In any event, and as noted above, it is contemplated that large amounts of data may necessitate the use of a "big data" or other distributed processing and data storage platform efficiently to store and process the data necessary or desirable for optimum or effective operation. For instance, it may be desirable to collect many data points at a high frequency over an extended period of time when the VPA system is first implemented to map the network space accurately; during the ensuing maintenance or stasis period of operation, accuracy may be suitably maintained while the monitoring frequency is reduced.

In some big data or distributed platform implementations, a VPA system and method may be embodied in or comprise an R package (e.g., "\VPA") that utilizes Hadoop™, for example, or another distributed storage and processing framework that enables efficient processing of large amounts of data. In this example, the R package may orchestrate Hadoop Map-Reduce Jobs, Hive tables, and R code. In operation, a VPA system and method may employ an algorithmic approach to produce a .csv file that can be read into a mapping tool for verification and auto-correction. In one commercial implementation, a VPA algorithmic analysis may require approximately one day to analyze a distribution network approximately the size of the entire FPL distribution network and the analysis may be run periodically such as once per week. As noted above, more or less extensive computations and higher or lower frequencies may be desirable as a function of network distribution circumstances, cost-benefit analyses, available processor bandwidth or other resources, and corporate objectives.

Turning back to the drawing figures, FIG. 3 is a flow diagram illustrating the general operational flow of implementations of a utility distribution system employing voltage pattern analysis. As contemplated in FIG. 3, the process 300 generally begins with a current meter-transformer mapping. As indicated at block 301, each meter, m, is mapped to a transformer, Tx. For purposes of this disclosure, this mapping is generally referred to as a meter-transformer pair and is denoted as (m; Tx).

At block 302, a voltage signal correlation may be imputed for each meter-transformer pair (m; Tx). Specifically, the process may impute a voltage signal correlation for every meter-transformer pair on the distribution grid. In one implementation, this may be effectuated by computing summary statistics of a pairwise voltage signal correlation for each of the meters on (i.e., connected to or associated with) a particular transformer. As noted above with reference to FIG. 2, this operation may be executed by correlation component 261.

It is noted that, as typically employed, and irrespective of the particular utility being metered, each AMI meter records a voltage reading at regularly spaced time intervals. For purposes of this disclosure, a voltage time series with a number, l, of timestamps for meter $m_i$ on the $k^{th}$ transformer is generally denoted as the vector $$v_i^k = (v_{i1}, \ldots, v_{il})$$

Also, meter-meter correlations $c_{ij}^k$ between meters $m_i$ and $m_j$ on the $k^{th}$ transformer are defined as $$c_{ij}^k = \mathrm{cor}(v_i, v_j) \qquad \text{Equation (1)}$$

Figure 4:
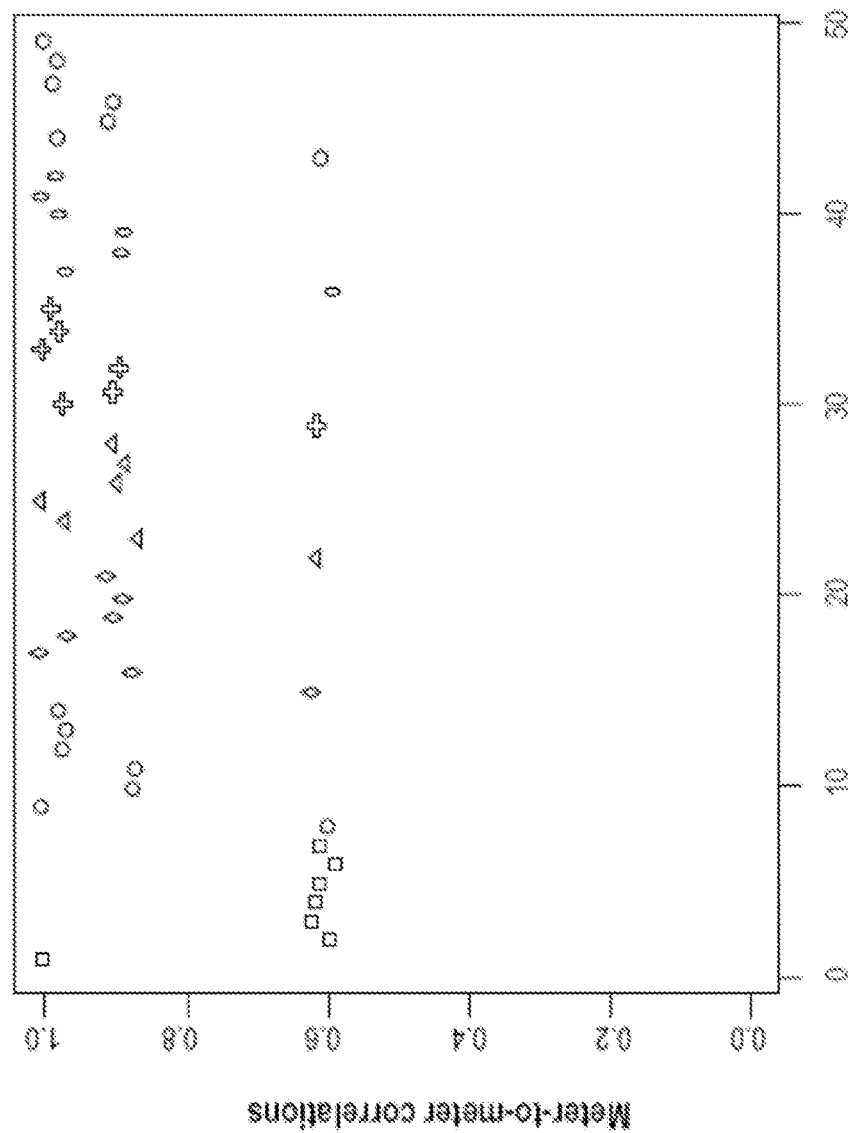
FIG. 4 is a plot illustrating an example of pairwise voltage signal correlations for a transformer with seven meters attached to it.

FIG. 4 is a plot illustrating an example of pairwise voltage signal correlations for a transformer with seven (7) meters ($m_1, m_2 \ldots m_7$) attached to it. In FIG. 4, the y-axis represents correlation values and the x-axis represents a respective correlation between meters on a particular transformer, as set forth below; there are forty-nine (49) correlations in total depicted in FIG. 4. For a transformer with n meters attached to it, there will generally be $n^2$ correlations computed, with some being repeated correlations—for example, the correlation between $m_1$ and $m_2$ will be the same as the correlation between $m_2$ and $m_1$, and so forth. It is also noted that the correlation between a meter and itself is always 1.0. In FIG. 4, the left-most seven data points (identified by the squares) represent correlations between meter $m_1$ and the other six meters on the transformer, the next seven data points (identified by the circles) from the left represent correlations between meter $m_2$ and the other six meters on the transformer, and so forth.

Figure 5:
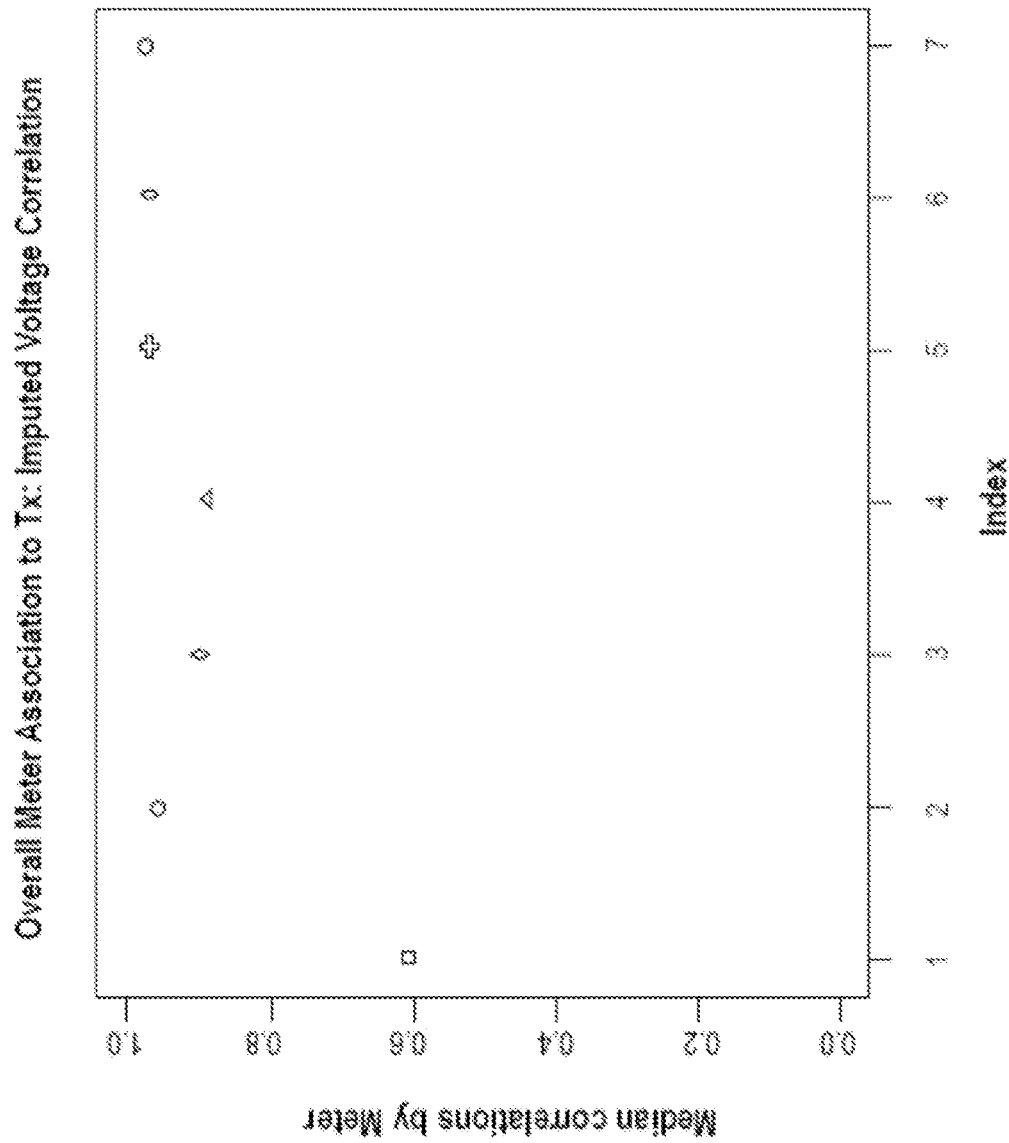
FIG. 5 is a plot illustrating an exemplary correlation for each meter on the transformer represented in FIG. 4.

The imputed voltage signal correlation for a meter-transformer pair ($m_i$; $Tx^k$) may be denoted as $$c_{(m_i; Tx^k)} = \mathrm{median}\{c_{i1}, c_{i2}, \ldots, c_{in}\} \qquad \text{Equation (2)}$$

where n is the number of meters on the $k^{th}$ transformer. It will be appreciated that the quantity $c_{(m_i; Tx^k)}$ provides an indication of how well the $i^{th}$ meter, $m_i$, correlates with other meters on the currently mapped or assigned transformer. Every meter-transformer pair has an imputed voltage signal correlation. It is calculated by computing n correlations and then taking the median. FIG. 5 is a plot illustrating a correlation for each meter on the transformer represented in FIG. 4 (with the y-axis representing a median correlation value and the x-axis (Index) representing a particular meter). In FIG. 5, each data point from the left represents a correlation between a respective meter ($m_1$, $m_2$, etc., starting from the left) and the transformer. In the foregoing manner, an imputed voltage signal correlation may be calculated for every meter in the distribution grid, for example, thereby providing a correlation value indicating how well any particular meter generally correlates to its currently assigned transformer. As noted above, the foregoing may be computed by correlation component 261 illustrated and described with reference to FIG. 2.

As indicated at block 303 in FIG. 3, a VPA system and method may determine which meters appear likely to be misassociated vis-à-vis a respective currently mapped transformer. It will be appreciated that some or all of the functionality contemplated at block 303 may be executed or enabled by candidate component 262 described above with reference to FIG. 2. Continuing with the present example, $C^k$ generally denotes all the pairwise correlations for the $k^{th}$ transformer, $Tx^k$, and may be defined as $$C^k = \{c_{ij}^k\} \qquad \text{Equation (3)}$$

Next, a misassociation threshold may be identified or computed to facilitate identification of erroneously mapped, or misassociated, meters. Though a VPA technique operative in accordance with the present disclosure is compatible with any of a variety of methods for identifying or computing a suitable threshold depending upon the circumstances and desired operability, in some implementations it may be desirable to define such a misassocation threshold, $t^k$, for the transformer $Tx^k$ as one standard deviation below the mean correlation on $Tx^k$:

$$t^k = \mathrm{mean}(C^k) - \mathrm{stdev}(C^k) \qquad \text{Equation (4)}$$

In this example, $C^k$ represents the 49 correlations pictured in FIG. 4, and the threshold is one standard deviation below the mean of those 49 correlations. Now consider the set of imputed voltage signals for each meter, $m_i$, attached to $Tx^k$ $$C = \{c_{(m_1; Tx^k)}, c_{(m_2; Tx^k)}, \ldots, c_{(m_n; Tx^k)}\} \qquad \text{Equation (5)}$$

and define $m^k$ as the misassociation set for the $k^{th}$ transformer:

$$m^k = \{c_{(m_i;Tx)} \in C | c_{(m_i;Tx)} < t^k\} \quad \text{Equation (6)}$$

Figure 6:
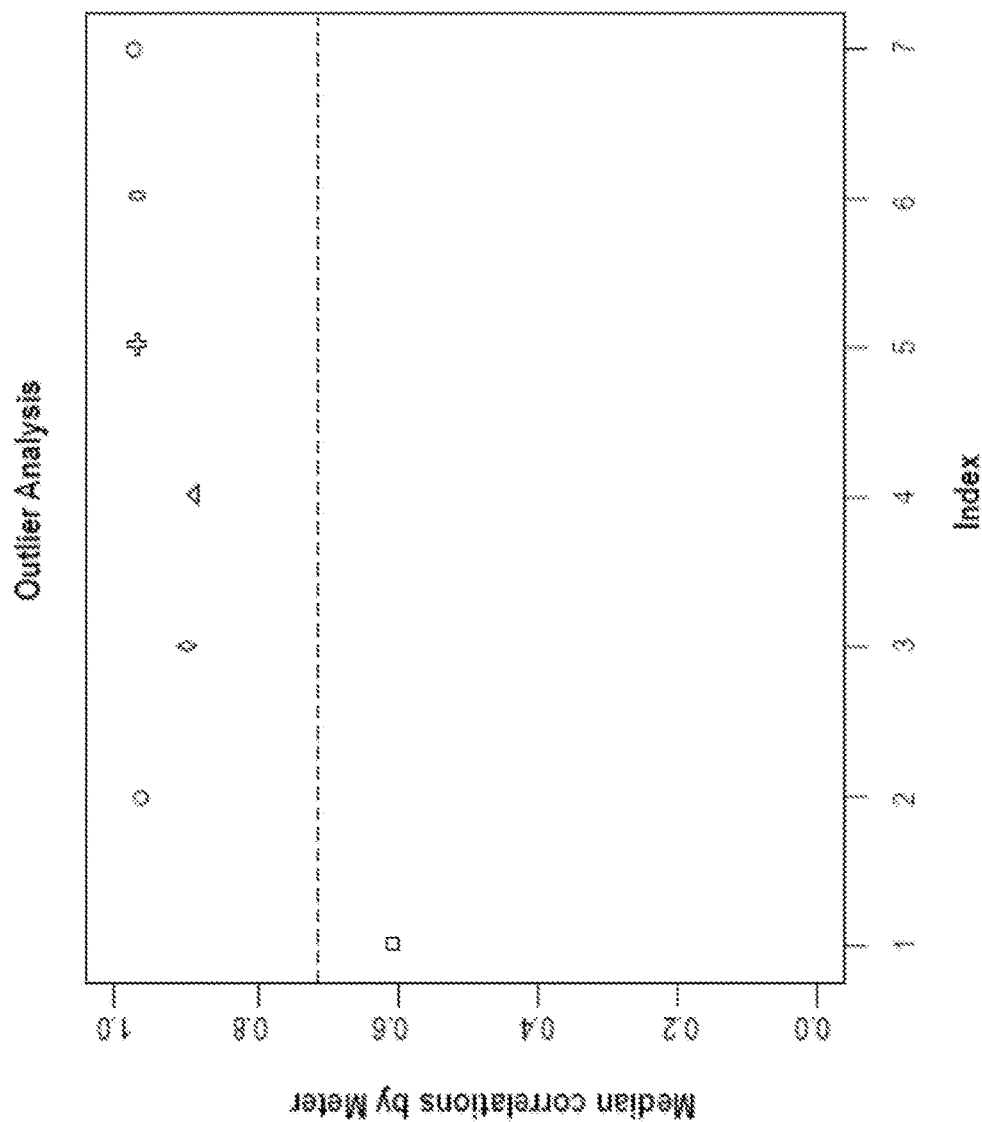
FIG. 6 is a plot illustrating how misassociation candidates may be identified in an example VPA system and method.

FIG. 6 is a plot illustrating how misassociation candidates may be identified in an example VPA system and method. The FIG. 6 plot depicts the seven (7) imputed voltage signal correlation values on the transformer, along with a dashed horizontal line showing the misassociation threshold $t^k$ for this particular transformer. In the example of FIG. 6, only one misassociation candidate is identified: m, which is represented by the (square) data point below the misassociation threshold line.

As noted above, it may be desirable to perform this analysis for every transformer in the system; in some circumstances (during a service test, upgrade, or outage, for example, or responsive to a request from a small municipality or private customer), only a subset of transformers, meters, or both, may be analyzed. In any event, a set, M, may be defined as the universe of missassocation candidates where $$\mathcal{M} = \{m^i\}_{i=1}^T$$

where $m^i$ is the $i^{th}$ misassociation set as defined in Equation 6 and T is the number of transformers in the system or the number of transformers analyzed, depending upon the context and the implementation details. Candidate component 262 may be configured in accordance with various rules or corporate objectives, depending upon known distribution grid characteristics or operational or environmental parameters, for example, to adjust the threshold level depicted in FIG. 6 as necessary or desired to optimize performance.

As indicated at block 304 in FIG. 3, a VPA system and method may selectively reassign identified candidates to a different transformer. In accordance with one implementation, for example, some or all of the following process steps may be executed by assignment component 263 (see FIG. 2) for every meter, $m_p$, in the universe of misassociation candidates, i.e., set M.

(a) Create meter-transformer candidate pairs. For instance, a VPA system and method may locate some or all transformers within a specified radius of a particular meter, $m_p$, and create a set of meter-transformer candidate pairs, $R_p$, pairs for $m_p$ as follows:

$$R_p = \{(m_p, Tx_{p1}), (m_p, Tx_{p2}), \ldots, (m_p, Tx_{pr})\} \quad \text{Equation (7)}$$

In this example, each of transformer, $Tx_{pk}$, may be considered a valid reassignment candidate for $m_p$. It is noted that the search radius from $m_p$ may be selectively modified in accordance with known physical, logical, and operational characteristics of the network topology or other factors. In some instances, for example, the radius may be on the order of tens or hundreds of meters, though kilometer scales may be appropriate in some instances (e.g., in rural areas or during periods of widespread outages following environmental disasters, wildfires, theft, sabotage, etc.). In some commercial implementations, a radius of approximately 150 meters may provide a suitable number of candidate pairs without requiring unnecessary or excessive computational overhead, given the manner in which most commercial transformers are spaced in the distribution map. Additionally, in some cases, physical restrictions associated with wires presently available may limit a radius to about 150 meters, because a wire connecting the meter to the transformer may not reach further than that distance.

(b) Impute a modified voltage signal correlation. For each $(m_p; Tx_{pk})$ in the set $R_p$, a VPA system and method may impute a modified voltage signal correlation such as those illustrated in FIG. 4. In that regard, the calculation here may employ equations (1) and (2) as set forth above in the discussion of FIG. 4, except in this instance, the calculation includes every meter that is currently mapped to transformer $Tx_{pk}$ plus the misassociated meter $m_p$ for which a new transformer mapping is sought. As a result of the foregoing process, a set of r correlations for $m_p$ may be identified as follows:

$$C_p = \{c^1, c^2, \ldots, c^T\}$$

(c) Rank and reassign. In accordance with one implementation of a VPA system and method, the values of $C_p$ may be ranked from highest to lowest, for instance. In this situation, the $(m_p; Tx_{pk})$ pair with the maximum correlation value may be assigned as the correct meter-transformer mapping. This mapping may then be compared to the current mapping for $m_p$ to see if the newly assigned transformer is different from the currently mapped transformer. If it is different, the newly assigned pair is given a score, $s_p$, for the new correlation weighted by a distance:

$$s_p = \frac{\text{Cor}_{new}}{2} \times \min\left(\frac{\text{Dist}_{map}}{\text{Dist}_{new}}, 2\right) \quad \text{Equation (8)}$$

As indicated at decision block 390, a determination may be made regarding whether the new assignment represents an improvement in correlation as compared to the previous assignment. This determination may be made by assignment component 263 either independently or in cooperation with correlation component 261, for instance, and in some implementations may occur concomitantly or nearly or entirely simultaneously with the foregoing description of operation of assignment component 263, or in an iterative fashion. As noted above, such a determination may be effectuated or facilitated by processor 290 or vector engine 291, for example, or in cooperation with one or more data processing systems or apparatus external to VPA module 260. In some implementations, for example, it may be desirable to compare the new assignment correlation against a predetermined threshold or some other objective measure resident in or maintained by processing and billing systems 155. If the new correlation represents an improvement, the process may end, whereas if the new correlation does not represent an improvement, or does not represent a significant enough improvement based upon predetermined or other criteria, the process may loop back to block 301 or to block 302, as indicated in FIG. 3.

As mentioned previously, one significant challenge of implementing a VPA system and method is to do it at scale. In some implementations, it may be necessary or desirable to employ big data infrastructure and methodologies to accommodate vast amounts of data and intensive processing requirements. One implementation of a VPA enabled utility distribution system and method utilizes the Hadoop ecosystem to address these challenges, though other distributed processing and data storage solutions may be equally functional. In the case where Hadoop is employed, raw data are stored in HBase tables; Map-Reduce jobs are used to pull these data and write them to the Hadoop Distributed File System (HDFS). Once written in HDFS, these data may be stored in Hive tables for summary statistical or other calculations, read into R, or both. In operation, the entire VPA process may be run via an R script that executes Hadoop Map-Reduce jobs and Hive scripts via system commands.

The steps for running the VPA process are set forth as follows, by way of example, and not by way of limitation:

Step 0: dataStep ( ): the purpose of this step is to dump raw data and filter in a manner suitable for the VPA process. The Map-Reduce jobs employed at this step are listed in the table below.

| Type of Data | Map-Reduce Job Description |
| --- | --- |
| Meter-transformer topology | Data dump of the mapping between meter and transformer, latitude and longitude of meters, zip code, and premise information |
| Transformer attributes | Data dump of latitude and longitude of transformers, transformer type, and transformer bank code |
| AM1 meter voltage readings | Uses AM1 meter voltage readings to calculate correlation to between meter-meter pairs |

Step 1: getVoltageCorrelations( ): the purpose of this step is to execute a call to an Hadoop Map-Reduce job to calculate all meter-meter voltage signal correlations.

Step 2: getInitialMisAssociations( ): after the voltage signal correlations are calculated, they are written to HDFS and stored in a Hive table. The correlation summary statistics, such as the imputed voltage signal correlation for the meter-transformer pairs, and the outlier analysis threshold are calculated in this step. As set forth in detail above, the misassociation candidates are identified based on these calculations.

Step 3: mTxPairs( ): the purpose of this step is to create meter-transformer pairs by identifying transformers within a specified or predetermined radius of each misassociation candidate. Each transformer identified here is generally considered a possible re-assignment candidate for the meter. This code is written in R.

Step 4: getVoltageCorrelations( ): once all the meter-transformer reassignment candidate pairs have been created, the voltage signal correlation calculation is run on all the pairs. This is the same Hadoop Map-Reduce job as listed in Step 2 but with a different input set that includes the misassociation candidate meter.

Step 5: assembleResults( ): the results of the second voltage correlation calculation are written to HDFS and stored in a Hive table. This step identifies which meters should be reassigned and calculates the score using Hive. The output is written to a local .csv file.

In one example implementation, the system has the potential benefit of pairwise analysis of meters and a very low sample rate. As is generally known, signals having a frequency of about 60 Hz typically require a sample rate of at least 120 data samples per second to analyze. One implementation of the present disclosure, however, provides for a single RMS (root mean square) or other voltage sample to be communicated by a meter at a frequency materially lower than 60 Hz, for example, once per hour. Transmitting a voltage reading once per hour (as opposed to 120 data samples (or more) per second) has the advantage of significantly reducing the bandwidth of network 190 occupied by communication from meters, thereby reducing the cost of bandwidth of the data communications. In this scenario, to reduce cost associated with communication bandwidth, data storage, and computational overhead, it may be desirable to sample meters' voltage signals infrequently as set forth above. By way of example, in a high-resolution application: a data sample may be acquired and transmitted approximately 120 times per second, with a measurement resolution of +/−0.001 volts, as noted above; assuming a straightforward transmission of one numerical timestamp (8-byte integer) and one numerical voltage measurement (8-byte floating-point value) per sample, these data amount to approximately 4000 MB (megabytes) per month per meter; for a utility with 5 million meters, storing a year's worth of data in order to compute correlations between meters would involve about 220 PB (petabytes), an impractical size with today's technology. On the other hand, the approach described herein has the advantage of requiring far less data: where voltages are sampled approximately once per hour, with low measurement resolution (4-byte integer timestamp, 3-byte voltage reading), these data translate to about 5 KB (kilobytes) per month per meter, or about 280 GB (gigabytes) for 5 million meters for a year, a much more economical size in both data bandwidth and data storage requirements. This approach may minimize or eliminate the need for advanced time series compression techniques, specialized correlation algorithms, and associated processes.

The descriptions set forth above are meant to be illustrative and not limiting. Various modifications, in addition to those described herein, will be apparent to those skilled in the art from the foregoing description. Such modifications are also intended to fall within the scope of the concepts described herein. Each patent, patent application and publication cited or described in this document are hereby incorporated herein by reference, in their entireties.

The foregoing description of possible implementations consistent with the present disclosure does not represent a comprehensive list of all such implementations or all variations of the implementations described. The description of some implementation should not be construed as an intent to exclude other implementations. For example, artisans will understand how to implement the illustrative examples in many other ways, using equivalents and alternatives that do not depart from the scope of the disclosure. Moreover, unless indicated to the contrary in the preceding description, none of the components described in the implementations are essential to the arrangements disclosed. It is thus intended that the implementations be considered as illustrative, with a true scope and spirit of the disclosure being indicated by the following claims.

What is claimed:

1. A method employing voltage pattern analysis, said method comprising:
receiving, by voltage pattern analysis (VPA) module operating on one or more computing devices, meter readings from each of a first plurality of meters assigned to a given distribution node in a set of distribution nodes in a metered utility distribution system over a given period of time, wherein the meter readings comprises a voltage time series for the given period of time for each meter of the first plurality of meters;
calculating, by the VPA module, a voltage signal correlation for each meter of the first plurality of meters assigned to the given distribution node in the set of distribution nodes;
imputing, by the VPA module, a voltage signal correlation for each distribution node in the set of distribution nodes;
performing, by the VPA module an outlier analysis by comparing an individual meter correlation with results of said imputing to identify a meter candidate for reassignment, wherein the voltage signal correlation between the meter candidate and the first plurality of meters exceeds a misassociation threshold; and responsive, by the VPA module, to said performing, for a meter of the first plurality of meters identified as the meter candidate, identifying a different distribution node of the set of distribution nodes within a specified radius as a distribution node candidate;

reassign the meter candidate to the different distribution node, wherein the reassigning comprises:

imputing a modified voltage signal correlation between the meter candidate and the distribution node candidate; and assigning the meter candidate to the distribution node candidate in response to determining that the modified voltage signal correlation between the meter candidate and the distribution node candidate is an improvement over the voltage signal correlation between the meter candidate and the given distribution node.

2. The method of claim 1 wherein said imputing of the voltage correlation signal comprises computing summary statistics of a pairwise voltage signal correlation for each meters of the first plurality of meters assigned to a given distribution node.

3. The method of claim 2 wherein said computing comprises quantifying how well each meter correlates with other meters on the given distribution node.

4. The method of claim 1 wherein the metered utility distribution system is an electrical distribution utility, the distribution node corresponds to a transformer, and the distribution node candidate corresponds to a transformer candidate.

5. The method of claim 4 wherein said reassigning comprises creating a meter-transformer candidate pair comprising the meter candidate and the transformer candidate.

6. The method of claim 4 wherein said reassigning further comprises quantifying how well the meter candidate correlates with other meters assigned to the distribution node candidate.

7. A voltage pattern analysis system comprising computer hardware and a computer-readable storage medium and operative to:

receive meter readings from each of a first plurality of meters assigned to a particular transformer in a set of transformers in a metered utility distribution system over a given period of time, wherein the meter readings comprises a voltage time series for the given period of time for each meter of the first plurality of meters;

calculate a pairwise voltage signal correlation for each meter assigned to the particular transformer in the set of transformers;

impute a voltage signal correlation for each transformer in the set of transformers;

perform an outlier analysis by comparing an individual meter correlation with results of the imputed voltage signal correlation to identify a meter candidate for reassignment, wherein the voltage signal correlation between the meter candidate and the first plurality of meters exceeds a misassociation threshold;

responsive to the outlier analysis, for a meter identified as the meter candidate, identify a different transformer of the plurality of transformers within a specified radius as a transformer candidate; and reassign the meter candidate to the transformer candidate, wherein the reassigning comprises:

imputing a modified voltage signal correlation between the meter candidate and the transformer candidate; and assigning the meter candidate to the transformer candidate in response to determining that the modified voltage signal correlation between the meter candidate and the transformer candidate is an improvement over the voltage signal correlation between the meter candidate and the particular transformer.

8. The voltage pattern analysis system of claim 7, wherein the system is further configured and operative to compute summary statistics of a pairwise voltage signal correlation for each of the meters assigned to the particular transformer.

9. The voltage pattern analysis system of claim 7, wherein the system is further configured and operative to quantify how well the meter candidate correlates with other meters assigned to the transformer candidate.

10. A method employing voltage pattern analysis, said method comprising:

receiving, by voltage pattern analysis (VPA) module operating on one or more computing devices, meter readings from each of a first plurality of meters assigned to a particular transformer in a set of transformers in a metered utility distribution system over a given period of time, wherein the meter readings comprises a voltage time series for the given period of time for each meter of the first plurality of meters;

calculating, by the VPA module, a voltage signal correlation for each meter of the first plurality of meters assigned to the particular transformer in the set of transformers;

imputing, by the VPA module, a voltage signal correlation for each transformer in the set of transformers;

performing, by the VPA module, an outlier analysis by comparing an individual meter correlation with results of said imputing to identify a meter candidate for reassignment, wherein the voltage signal correlation between the meter candidate and the first plurality of meters exceeds a misassociation threshold; and responsive, by the VPA module, to said performing, for a meter of the first plurality of meters identified as the meter candidate, reassigning the meter candidate to a transformer candidate of the set of transformers, wherein the reassigning comprises:

imputing a modified voltage signal correlation between the meter candidate and the transformer candidate; and assigning the meter candidate to the transformer candidate in response to determining that the modified voltage signal correlation between the meter candidate and the transformer candidate is an improvement over the voltage signal correlation between the meter candidate and the particular transformer.

11. The method of claim 10 wherein said reassigning comprises identifying the transformer candidate within a specified radius from the meter candidate.

12. The method of claim 10 wherein said calculating comprises calculating a pairwise voltage signal correlation for each meter assigned to a transformer in a set of transformers in the metered utility distribution system.

13. The method of claim 10 wherein said reassigning comprises creating a meter-transformer candidate pair comprising the meter candidate and the transformer candidate.

14. The method of claim 10 wherein said reassigning further comprises quantifying how well the meter candidate correlates with other meters assigned to the transformer candidate.

15. The method of claim 10, wherein the misassociation threshold is one standard deviation below a mean of pairwise correlations between each meter of the first plurality of meters.

16. The method of claim 10, wherein each of the first plurality of meters is coupled to a respective one of a plurality of sites that have a time varying load, wherein a variance of load at a given site of the plurality of sites coupled to the particular transformer impacts the meter reading of each meter of the first plurality of meters coupled to the particular transformer.

17. The method of claim 10, wherein the particular transformer of the plurality of transformers has a unique voltage pattern that impacts the meter reading of each meter of the first plurality of meters coupled to the particular transformer.

* * * * *